United States Patent [19]

Bachle

[11] 4,088,327
[45] May 9, 1978

[54] SEALING RING WITH TABS FOR HOLDING FOR ASSEMBLY

[75] Inventor: Walter W. Bachle, Harwinton, Conn.

[73] Assignee: General Signal Corporation, Rochester, N.Y.

[21] Appl. No.: 809,139

[22] Filed: Jun. 22, 1977

[51] Int. Cl.² ................. F16J 15/06; F16B 39/24
[52] U.S. Cl. ........................... 277/11; 277/119; 277/222; 151/7; 285/23; 403/12
[58] Field of Search ............... 403/12; 151/7, 14.5; 285/23; 277/119, 11, 9, 9.5, 207 R, 216, 222

[56] References Cited

U.S. PATENT DOCUMENTS

| 267,862 | 11/1882 | Fletcher | 151/7 |
| 771,935 | 10/1904 | Reynolds | 151/14.5 |
| 1,443,751 | 1/1923 | Lafever et al. | 151/14.5 |
| 1,483,352 | 2/1924 | Kiefer | 277/216 |
| 1,957,095 | 5/1934 | Cole | 151/14.5 X |
| 2,399,639 | 5/1946 | Kelly | 151/7 X |
| 3,332,141 | 7/1967 | Hopp | 277/9 X |

FOREIGN PATENT DOCUMENTS

| 942,114 | 11/1963 | United Kingdom | 277/11 |
| 1,291,121 | 9/1972 | United Kingdom | 151/7 |

Primary Examiner—Robert S. Ward, Jr.
Attorney, Agent, or Firm—Milton E. Kleinman; George W. Killian

[57] ABSTRACT

One or more radially projecting tabs are provided on a discontinuous ring for retaining the ring in proper association with a body member in spite of movement or vibration of the assembly. The tab, or tabs, mate with a grooved section of the body member. The groove may comprise a thread. The ring may be internal or external to the body member. The retaining tab will project radially outward or inward when the ring is to be internal or external, respectively, to the body member. The tabs have an axial thickness of the order of 25 percent, or less that of the ring. To provide secondary internal retaining means, a portion of the ring may be cut from an oversize ring so that a stress is formed when the ring is closed for inserting the ring in an internal opening. When a ring is to be used external to a body member, a simple cut may be made in an undersize ring so that a stress is formed when the ring is opened for placement external to the body member. The ring may be fabricated from any suitable material including: metal, plastic, or an elastomeric material. When the ring is made of appropriate material and cut at an appropriate angle, it may be used as a seal.

13 Claims, 4 Drawing Figures

SEALING RING WITH TABS FOR HOLDING FOR ASSEMBLY

BACKGROUND OF THE INVENTION

In manufacturing processes, it is often desirable and economical to assemble devices from a collection of subcomponents, some of which may include two or more elements. Frequently, a nut or body member will have another member associated therewith. For example, a nut may require an associated lock washer. If the two members can be assembled and retained together as a single unit, the final assembly may be completed more economically and with a reduced chance of the inadvertent omission of one member. Similar situations prevail with retaining rings, gaskets, pressure seals, and other devices associated with a body member.

This invention relates to the class of devices wherein it is desirable to have a ring, collar, seal, or other member retained in association with a body member or nut. Simple elastomeric O-rings are frequently retained within body members, or a nut, by providing an undercut in the hole into which the O-ring may be placed by temporary initial deformation thereof. Sometimes an attempt is made to hold a collar, seal or O-ring (hereinafter referred to only as a ring) in place by providing a ring which has an outside diameter slightly larger than the inside diameter of the hole within which the ring is to be retained; or by using an underside ring when it is to be retained external to a body member. When this technique is used, the ring may fail to hold as a result of vibration. To overcome this difficulty, adhesives have been used. Adhesives have been useful when the ring is fabricated from a rigid material which cannot be deformed as described above.

Various prior art techniques have each served admirably in specific applications. In some applications, the ring is required to be able to move independently of the body member, or nut, and, therefore, an adhesive retention means is unacceptable. As suggested, when a ring is fabricated of a rigid or inflexible material, it cannot be deformed, stretched or compressed to cause it to enter a retaining undercut section. Some subassemblies with a ring have required a mechanical modification of the body member after insertion of the rigid ring member.

SUMMARY OF THE INVENTION

The invention relates to a ring, collar, or other element (hereinafter referred to only as a ring) which may comprise an elastomeric material, but may also comprise a metallic material, or relatively rigid plastic material, or any other suitable substance which has some elasticity. The ring of the invention includes a discontinuity, or cut, which normally does not minimize the surface area of the cut. Usually the cut in the ring is skew to the plane including the internal circular axis of the ring.

A ring for internal use includes a preformed stress such that the ring assumes a generally circular shape with a separation between the faces of the cut. This may be obtained by cutting a section from an oversize ring. Thus when the ring is placed within a hole, which has an internal diameter approximately equal to the outside diameter of the ring when the ends are joined, there will be an expanding stress which will help retain the ring within the hole. However, the primary retention means includes one or more proturberances, wings, or tabs which project radially from the ring and usually lie in a plane, or planes, parallel to or including the circular axis of the ring. The protuberances, wings, or tabs, (hereinafter referred to only as tabs) may project into an undercut area in the hole. The undercut area may include a thread. The engagement of the tab and the undercut area, together with the preformed stress of the ring, will provide a means for securely retaining the ring within a hole in a body member irrespective of vibrations resulting from shipping or movement of the subassembly prior to use. Normally, the axial thickness of the tabs will not be over about 25 percent of the axial thickness of the ring.

A ring for external use on a body member may be cut from an undersize ring to provide the preformed stress and, of course, the tabs would be directed radially inward, rather than outward.

In commercial applications, the ring may be placed within a nut and may serve as a device to keep the nut from loosening on a bolt as a result of vibration. In other applications, the ring may be used to provide a liquid tight seal. Other uses and applications will readily occur to those familiar with the assemblies and devices of the prior art.

It is an object of this invention to provide a new and improved means for retaining a ring on a body member.

It is a more specific object of the invention to provide a device of the character mentioned wherein the ring may comprise a member with minimum elasticity.

It is another object of the invention to retain a seal or ring within a body member, or external to a body member, to prevent loss of the part and to avoid handling of multiple parts and reduce assembly time.

It is another object of the invention to provide a body member and associated ring which may be radially replaced at any time.

It is another object of the invention to provide a device of the character described wherein the ring has a discontinuity.

It is another object of the invention to provide a structure of the character described wherein the ring includes protuberances or wings for extending into an undercut area of the body member.

BRIEF DESCRIPTION OF THE DRAWING

The drawing comprises four figures in which like elements are given identical identification numbers.

DESCRIPTION OF THE PREFERRED EMBODIMENT

Considering now more specifically FIG. 1, there will be seen a sealing ring, or collar, (hereinafter referred to only as a ring) and which is identified generally as 101. An axis 102 of the ring 101 is shown. The axis 102 is, of course, at right angles to the series of parallel planes, each of which include the ring 101.

Figure 2:
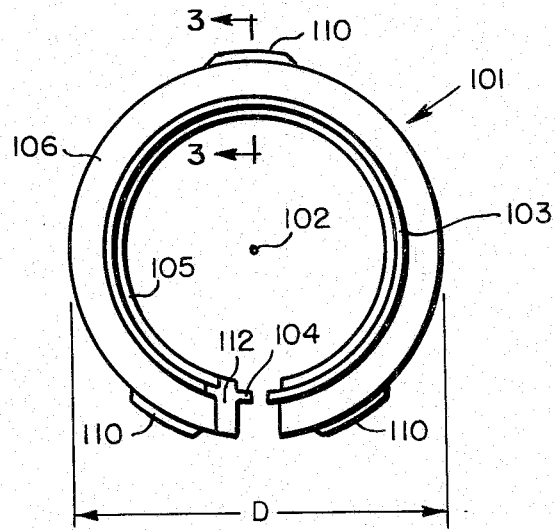
FIG. 2 comprises a top view of the ring of FIG. 1.
Figure 3:
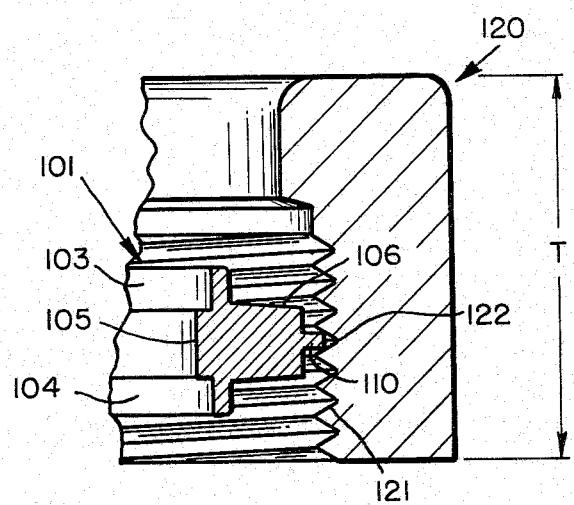
FIG. 3 comprises a cross section of the ring of FIG. 2 taken on line 3—3 and including a cross section of an associated nut in which the ring may be placed.

FIG. 2 is a top view of the ring 101 and FIG. 3 includes a cross section of the ring 101 as taken on the line 3—3 of FIG. 2. As may be seen in these figures, the ring 101 does not have a circular cross section when cut by a plane which includes the axis 102. However, in another assembly the ring 101 might have a circular cross section or some other shape. In the illustrated example, the ring 101 includes an upper fin 103 and a lower fin 104. The ring 101, as illustrated, includes an inner flange 105 and an outer flange 106. In addition, the ring 101 includes one or more tabs 110 which serve a function to be described more fully hereinafter.

Figure 1:
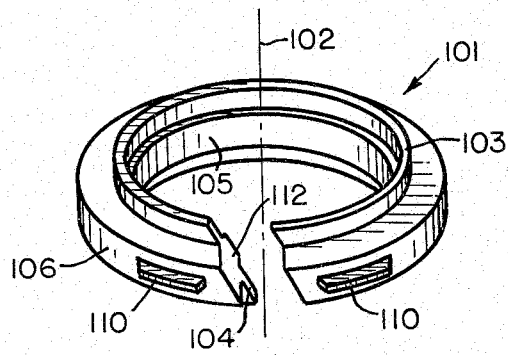
FIG. 1 comprises an isometric view of a typical ring comprising the invention.

As is most readily seen in FIGS. 1 and 2, the ring 101 is a discontinuous ring which could be fabricated from a continuous ring by making a cut, or removing a portion of the ring. Or the ring 101 could be molded or fabricated from extruded bar material which is preformed to the ring shape illustrated. The angle of the face 112 with respect to a right section through the ring may be at any convenient angle, or angles, depending upon the particular application of the ring in the assembly. In an assembly which is designed to provide a liquid tight seal, the configuration of the face 112 would normally be congruent with the mating face and skew with respect to a plane, including the axis 102.

FIG. 3 illustrates the ring 101 inside a body member such as a nut 120 which includes threads 121 which, in the illustrated example, do not extend the entire thickness T of the nut 120. In other assemblies, the threads 121 might go clear through the nut 120, or the nut 120 might be a box nut with a closed end. Or in other situations, the member 120 may not include any threads 121, but in acccordance with the invention would include at least one undercut area such as 122, which in this illustration comprises a portion of the threads 121.

The ring 101 may comprise any suitable substance and/or cross sectional shape for the particular application for which it is designed. However, the present invention will have its greatest utility when the ring 101 is fabricated from a material which has some electricity, but is relatively stiff or unyielding. That is, although the ring 101 could be made from a variety of elastomeric substances, the invention has more direct applicability when the ring 101 is fabricated from any of a variety of metals, rigid plastics, or similar substances. Normally, a brittle material would not be used.

When the ring is to be used as illustrated in FIG. 3, and the material used to fabricate the ring includes any natural resiliency, advantage is taken of this quality by preforming the ring 101 with a stress that will tend to open the ring 101 with the face 112 separated from its mating face. If the ring 101 is closed, or the ends overlapped, so that it has a smaller diameter, the ring may be inserted in a nut 120, which has an internal diameter of the same magnitude, and when the ring 101 is released, it will tend to enlarge and bear against the interior of the nut 120 and thereby provide some retaining power. However, experience has shown that such retention means is insufficient to retain the ring 101 under adverse vibration, handling, and assembly conditions. Accordingly, and in accordance with the invention, the ring 101 includes tabs 110 which project radially from the ring 101. As may be most clearly seen in FIG. 3, the tab 110 is relatively thin and will usually have an axial thickness, as measured in the direction of axis 102, which is not over about 25 percent of the axial thickness of the ring 101. However, even if the ring 101 is made of yielding material, the tabs 110 will not yield very much due to their length-to-thickness ratio where the length is measured in the radial direction, or at right angles to the axis 102. As illustrated in FIG. 3, the tab 110 will engage with the undercut area 122 of the threads 121 and thereby provide a primary means for retaining the ring 101 within the hole of predetermined size in the nut 120. When assembled as shown in FIG. 3, the tab 110 will prevent the ring 101 from being shaken out of the nut 120 in response to handling and vibration of the subassembly. The ring 101 may be inserted into the nut 120 by reducing the diameter of the ring 101 by bringing together or overlapping the face 112 and its mating face which is usually congruent. Then when the ring 101 is released, it will attempt to assume a larger diameter and the tab 110 will engage with the undercut area 122 of the threads 121. If the body member 120 into which the ring 101 is to be inserted does not include threads 121, an undercut area 122 may be included to accommodate the tab 110.

If the ring 110 is properly designed and proportioned to mate with the nut 120 and/or other elements, the subassembly (101 and 102) may provide any of a wide variety of functions similar to those of prior art assemblies.

By cutting the face 112 at an angle with respect to the plane including the circular axis of the ring, it is practical to use the ring 101 to make liquid tight connection. The cut need not be confined to a single plane. For this service, the face 112 and the mating congruent face should be proximate when the subassembly is complete and in the final assembly with other components, not shown, at least part of the face 112 should be in contact with the mating face.

It will be apparent that a ring could be used on the exterior of a bolt by providing a ring which has a preformed stress to cause it to seek a minimum diameter and which is provided with tabs which extend radially inward instead of radially outward. One convenient way of obtaining the preformed stress is to start with an undersize ring and make a single cut.

Figure 4:
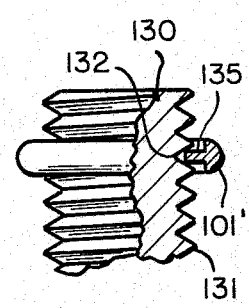
FIG. 4 illustrates an embodiment of the invention using an external ring on a body member.

FIG. 4 illustrates a ring used on the exterior of a bolt or projection 130 having threads 131 and/or an undercut area 132 which may comprise the roots of the threads 131 if threads are provided. A ring 101' is provided which has a tab 135 for engagement with the undercut area 132. The ring 101' is illustrated with a different cross sectional shape from the ring 101. However, as previously suggested, the cross sectional shape is not critical and may be modified to suit the exigencies of the particular application. The ring 101' may include a discontinuity similar to that used with ring 101 and the ring 101' may be preformed to seek a minimum diameter and thereby hug the protection 130 and provide a secondary retention means. The tab 135 engaging with the undercut area 132 helps prevent the ring 101' from being separated from the bolt 130 by vibration.

Since there is no deformation of the body member 120 or 130 to retain the ring 101 or 101', respectively, it is obvious that the rings 101 or 101' may be easily replaced if required.

It will also be apparent that with some materials and combinations of dimensions, a ring without a cut could be used and the ring retained in position by the tabs 110 which lodge in an undercut 122 and wherein the ring 101 and/or tabs 110 flex sufficiently to permit assembly. It will also be apparent that a single ring could include outwardly radiating tabs 110 and inwardly radiating tabs 135 so that the ring could be used internal to a body member or external to a body member.

While there has been shown and described what is considered at the present to be a preferred embodiment of the invention, modifications thereto will readily occur to those skilled in the related arts. For example, a continuous tab might be used or tabs might be used in parallel planes. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A subassembly comprising in combination:
    a. a discontinuous sealing ring having a predetermined axial thickness;
    b. said sealing ring including one or more radially projecting tab members having an axial thickness which is not more than about 25 percent the predetermined axial thickness of said sealing ring;
    c. a body member having an opening for accommodating said sealing ring in mating relationship; and
    d. an undercut portion in said opening having an axial thickness not less than that of said tab whereby said sealing ring may be retained in said opening when said tab is mated with said undercut portion.

2. The combination as set forth in claim 1, wherein said sealing ring is fabricated of elastic material.

3. The combination as set forth in claim 2, wherein said opening in said body member is of a first predetermined magnitude and the magnitude of the mating portion of said sealing, in its relaxed state, is greater than said predetermined magnitude.

4. The combination as set forth in claim 3, wherein said discontinuous sealing ring is formed in response to the removal of a section from a continuous ring to form first and second end faces.

5. The combination as set forth in claim 4, wherein said first and second end faces are congruent.

6. The combination as set forth in claim 5, wherein said first and second end faces are not of minimum cross section area.

7. The combination as set forth in claim 5, wherein said first and second end faces are brought into a proximate relationship in response to the mating of said sealing ring with said opening in said body member.

8. A subassembly comprising in combination:
    a. a discontinuous sealing ring having a predetermined axial thickness;
    b. said sealing ring including one or more radially projecting tab members having an axial thickness which is not more than about 25 percent of the predetermined thickness of said sealing ring;
    c. a body member having a projection for accommodating said sealing ring in mating relationship; and
    d. an undercut portion on said projection having an axial thickness not less than that of said tab whereby said sealing ring may be retained on said projection when said tab is mated with said undercut portion.

9. The combination as set forth in claim 8, wherein said sealing ring is fabricated of elastic material.

10. The combination as set forth in claim 9, wherein said projection of said body member is of a first predetermined magnitude and the magnitude of the mating portion of said sealing, in its relaxed state, is less than said predetermined magnitude.

11. The combination as set forth in claim 10, wherein said discontinuous sealing ring is formed in response to cutting a continuous ring to form first and second end faces.

12. The combination as set forth in claim 11, wherein said first and second end faces are congruent.

13. The combination as set forth in claim 12, wherein said first and second end faces are not of minimum cross section area.

* * * * *